United States Patent [19]

Schwaben et al.

[11] Patent Number: 5,112,921
[45] Date of Patent: May 12, 1992

[54] IMPACT-RESISTANT THERMOPLASTIC MOLDING MATERIAL AND ITS USE

[75] Inventors: Hans-Dieter Schwaben, Freisbach; Rainer Schlichtmann; Hubert Kindler, both of Ludwigshafen; Peter Klaerner, Battenberg; Hans Mittnacht, Weinheim, all of Fed. Rep. of Germany

[73] Assignee: BASF Aktiengesellschaft, Ludwigshafen, Fed. Rep. of Germany

[21] Appl. No.: 447,508

[22] Filed: Dec. 7, 1989

[30] Foreign Application Priority Data

Dec. 31, 1988 [DE] Fed. Rep. of Germany ....... 3844490

[51] Int. Cl.⁵ ................. C08F 279/02; C08L 51/04; C08L 25/06
[52] U.S. Cl. .................. 525/316; 525/265; 525/53; 524/751; 524/773
[58] Field of Search ............ 525/316, 265, 53; 524/751, 773

[56] References Cited

U.S. PATENT DOCUMENTS

| | | | |
|---|---|---|---|
| 3,903,202 | 9/1975 | Carter | 525/316 |
| 4,096,205 | 6/1978 | Reith | 525/314 |
| 4,312,802 | 1/1982 | Anspon | 525/316 |
| 4,362,850 | 12/1982 | Burk | 525/86 |

OTHER PUBLICATIONS

Encyclopedia of Polymer Science and Engineering, Second Edition, John Wiley & Sons, Chap. Title—"Graft Copolymers".

Primary Examiner—John C. Bleutge
Assistant Examiner—Vasu S. Jagannathan
Attorney, Agent, or Firm—Oblon, Spivak, McClelland, Maier & Neustadt

[57] ABSTRACT

An impact-resistant thermoplastic molding material which contains, based in each case on A+B, from 80 to 50% by weight of a hard matrix A of polystyrene having a molecular weight $\overline{M}\eta$ of from 150,000 to 200,000 and from 50 to 20% by weight of a soft phase B which is uniformly distributed in the hard matrix and has a median particle diameter $d_{50}$ (volume average) of from 1 to 10 μm, and can be obtained by polymerizing styrene in the presence of an elastomeric grafting base, advantageously has a molecular weight of the grafted branches of from 1.1 to 1.35 times the molecular weight of the hard matrix, and the degree of grafting is from 50 to 100%.

3 Claims, No Drawings

IMPACT-RESISTANT THERMOPLASTIC MOLDING MATERIAL AND ITS USE

The present invention relates to an impact-resistant thermoplastic molding material which contains, based in each case on A+B, from 80 to 50% by weight of a hard matrix A of polystyrene having a molecular weight $\overline{M}\eta$ of from 150,000 to 200,000 and from 50 to 20% by weight of a soft phase B which is uniformly distributed in the hard matrix and has a median particle diameter $d_{50}$ (volume average) of from 1 to 10 μm, as obtained by polymerizing styrene in the presence of a dissolved elastomeric grafting base.

The relevant prior art includes:
(1) German Laid-Open Application DOS 1,769,118
(2) German Laid-Open Application DOS 1,770,392 and
(3) German Published Application DAS 2,525,019.
(1) discloses molding materials whose soft phase consists of cellular particles of different sizes.
(2) describes a process for the preparation of such thermoplastic 2-phase molding materials having a cellular particle morphology.

It is also known that molding materials as described in (1) and (3) have a high impact strength but their rigidity is substantially reduced as a result of the toughening process. Hence, when they are used, for example, in the packaging sector, molding materials of this type have to be mixed with more rigid polystyrene to ensure that the rigidity and therefore the dimensional stability of the finished products are sufficient.

It is an object of the present invention to provide and prepare molding materials which have greater toughness and rigidity and are more suitable for extrusion.

We have found that this object is achieved by an impact-resistant thermoplastic molding material of the type stated at the outset, in which the molecular weight of the grafted branches is 1.1 to 1.35 times the molecular weight of the hard matrix and the degree of grafting is from 50 to 100%.

The novel molding material has a 2-phase structure and contains a hard matrix A and a soft phase B. Conventional additives may be introduced during or after the preparation of the molding materials.

The molding material contains the following components, based on A+B: from 80 to 50, preferably from 75 to 55%, by weight of A and from 20 to 50, preferably from 25 to 45%, by weight of B.

Additives may be present in an amount of from 0.5 to 25, preferably from 1 to 20, parts by weight per 100 parts by weight of the ready-prepared material comprising A+B. Component A The hard matrix of the novel molding material consists of polystyrene. The molecular weight of the hard matrix ($\overline{M}\eta$) is from 150,000 to 200,000, particularly preferably from 160,000 to 190,000. The preparation of such polystyrenes (also in the presence of rubber) is familiar to the skilled worker. It should be pointed out that neither the polystyrene occluded in the soft phase nor the grafted part of the polystyrene is counted as the hard matrix. Component B The novel molding material possesses, as component B, a soft phase which is finely dispersed in the hard matrix. The presence of the soft phase can be detected, for example, by means of an electron micrograph of the molding material. The proportion of the soft phase is determined by measuring the gel content. The soft phase is a graft copolymer of the monomer of the hard matrix with an elastomer (rubber) as the grafting base. The preparation and dispersion of a soft phase of this type are known.

The elastomers (rubbers) used are the natural and synthetic rubbers conventionally used for toughening the styrene polymers. For the purposes of the present invention, polybutadienes, polyisoprenes and copolymers of butadiene and/or of isoprene and styrene, which have a glass transition temperature of less than −20° C., are suitable.

The copolymers of butadiene or of isoprene and styrene may contain the monomers both randomly distributed and in the form of blocks. Polybutadienes having from 30 to 99% of cis-1,4-units are particularly preferred.

In the preparation of the soft phase B, the elastomer is used in an amount of from 4 to 12, preferably from 6 to 12%, by weight, based on the monomer a (the reaction mixture), a solvent and assistants, such as regulators, lubricants, etc., also being used if required.

The median molecular weight of the elastomers is from 50,000 to 400,000, in particular from 200,000 to 300,000 (weight average). The particles of the soft phase are cellular particles which have a median particle diameter, $d_{50}$ value, (volume average from image analysis) of from 1 to 10 μm, preferably from 1.5 to 8 μm, in particular from 2 to 6 μm. The polystyrene grafted and occluded in the soft phase is counted as the soft phase. Component C Examples of additives are the assistants conventionally used for the preparation of molding materials, such as mineral oils, conventional esters of aromatic or aliphatic carboxylic acids with aliphatic alcohols, polyalkylene oxides based on ethylene oxide and/or propylene oxide, molecular weight regulators, protective colloids or antioxidants.

Other suitable assistants are lubricants, such as zinc stearate, colorants, stabilizers and possibly flameproofing agents, in conventional amounts. Preparation of the novel molding material The novel molding materials are prepared by polymerizing styrene in the presence of the rubber, the latter first being dissolved in monomeric styrene and this starting solution then being polymerized while stirring. Polymerization of this type is referred to as mass polymerization.

Up to 25% by weight, based on the monomer mixture, of an inert solvent may be added to the reaction mixture. Examples of suitable solvents are aromatic hydrocarbons, such as toluene, ethylbenzene and xylene. Ethylbenzene is preferred. Polymerization of this type is referred to as solution polymerization.

The third possibility is to carry out polymerization first in the absence of a solvent and then in aqueous suspension. For this purpose, the solution of the rubber in the monomer is prepolymerized to a conversion of about 35% in the absence of a solvent and with stirring, after which the product is suspended in water and polymerization is then completed.

The novel molding materials are prepared in the presence of additives which influence the polymerization.

The conventionally used mercaptans of 4 to 18 carbon atoms can be used as chain-transfer agents. n-Butyl, n-octyl, n-dodecyl and tert-dodecyl mercaptan have proven particularly useful. These mercaptans are employed in amounts of from 0.01 to 0.3% by weight, based on the styrene.

Organic peroxides are used as polymerization initiators.

Suitable initiators of this type are alkyl or acyl peroxides, hydroperoxides, peresters or peroxycarbonates. Graft-active initiators, such as dibenzoyl peroxide, tert-butyl peroxy-2-ethylhexanoate, tert-butyl perbenzoate, 1,1-di(tert-butylperoxy)-cyclohexane and 1,1-di(tert-butylperoxy)-3,3,5-trimethylcyclohexane, are preferably used. The initiators are employed in an amount of from 0.005 to 0.2% by weight, based on the monomers. The action of the initiators can be influenced by additives, such as amines or, preferably, by the temperature.

As a rule, polymerization is carried out at from 50° to 200° C., preferably from 80° to 200° C., in all cases.

Polymerization may be carried out continuously or batchwise.

The continuous process is adequately described in, for example, DE-A-17 70 392 and the batchwise process is adequately described in DE-A-26 13 352.

If the material is completely polymerized, the result is a hard matrix of polystyrene with an occluded soft phase.

The soft phase (gel content) is understood here as meaning that part of the toughened polymer which is insoluble in toluene at room temperature (23° C.), minus any pigments. This soft phase has a heterogeneous structure and is formed during the preparation process. Its amount and its degree of dispersion is influenced by the process conditions.

The rubber solution to be polymerized separates into two phases shortly after the beginning of the polymerization, of which phases the solution of the rubber in the monomer initially forms the coherent phase while the second phase, a solution of the homopolymer in the monomer, remains in suspension in the first phase. As the conversion increases, the second phase increases with consumption of monomer; the phase coherence then changes.

In addition to this process, a graft reaction takes place in which the grafted branches consisting of polystyrene are chemically bonded to the rubber molecules. This process is known and is described in detail in, for example, Fischer, Angew. Makromol. Chem. 33 (1973), 35-74.

The novel parameters or the parameters described in the Examples and Comparative Experiments were determined as follows:

1. The molecular weight stated is the viscosity average of the molecular weight $\overline{M}\eta$. This is calculated from the viscosity number (VN) after conversion to the limiting viscosity according to Schulz-Blaschke, using the Mark-Houwink equation for polystyrene (cf. J. W. Breitenbach et al., Makromol. Chem. 81 (1964), 32 et seq.).

2. The yield stress [$\beta$N/mm$^2$], tensile strength [$\beta$N/mm$^2$] and elongation at break [%] are determined according to DIN 53,455, in a tensile test. The test specimens required for this purpose are compression molded at T=200° C.

3. The rate of polybutadiene can be obtained by the iodine number.

4. The viscosity number, VN, of the hard matrix in [ml/g] is determined similarly to DIN 53,724 (0.5% strength solution in toluene at 23° C.). To determine the VN of the hard matrix, the latter must be separated from the soft phase. For this purpose, 5 g of the molding material are dissolved in 50 ml of methyl ethyl ketone, and 50 ml of dimethyl ketone are added. Centrifuging is carried out until the supernatant solution is clear. This is decanted, and the matrix polystyrene present therein is isolated by precipitation in 10 times the amount of methanol followed by drying.

5. To determine the viscosity number of the grafted branches of the soft phase and the degree of grafting, the following procedure is used:

The opaque phase from the centrifuge separation process described above is dried under mild conditions (40° C., 10$^{-2}$ mbar, 3 h), weighed accurately and then dissolved in 50 ml of methyl ethyl ketone, 50 ml of dimethyl ketone are added, centrifuging is carried out, the phases are separated and drying is carried out again under mild conditions. This process must be repeated until the weight remains constant (as a rule 4 times).

Once a constant weight is obtained, the following procedure is carried out:

About 1.5 g of the soft phase are added to 80 ml of chlorobenzene and the mixture is heated for 30 minutes at 90° C. After the mixture has been cooled to 60° C., 1 ml of benzaldehyde, 2 ml of tert-butyl hydroperoxide (75%) and 0.1 ml of a 0.003 molar solution of osmium tetroxide in chlorobenzene are added. The mixture is then heated at 70° C. for 10 minutes. After the mixture has been cooled to 60° C., precipitation is effected by pouring it into 600 ml of methanol (acidified with one drop of HCl). The precipitate is left to stand for 12 hours at 20° C. and then separated quantitatively from the solvent and dried at 40° C. and under 10$^{-2}$ mbar until the weight remains constant.

It is then dissolved in methyl ethyl ketone, after which dimethyl ketone is added. The mixture is then centrifuged until a completely clear supernatant solution is obtained, this solution is decanted and the polystyrene present in the supernatant is isolated by precipitation in 10 times the amount of methanol followed by drying, and this treatment, referred to below as the MEK-DMK treatment, is repeated at least once. The treatment with OsO$_4$ is then repeated. This is followed again by an MEK-DMK separation, which is carried out at least twice; it must be carried out after each OsO$_4$ treatment until the weight of the soft phase remains constant. The absence of turbidity when the MEK-DMK solution is poured into the methanol serves as a check here.

The OsO$_4$ treatment and MEK-DMK separation must be repeated three times in total.

The remaining soft phase is then added to 80 ml of chlorobenzene and heated for about 30 minutes at 90° C. After the mixture has been cooled to 60° C., 1 ml of benzaldehyde, 2 ml of tert-butyl hydroperoxide (75%) and 0.1 ml of a 0.003 molar solution of osmium tetroxide in chlorobenzene are added. This solution is then heated for 15 minutes at 85° C. After the mixture has been cooled to 60° C., precipitation is effected by pouring it into 600 ml of methanol (acidified with one drop of HCl). The precipitate is left to stand for 12 hours at 20° C. and then separated quantitatively from the solvent and dried at 40° C. and under 10$^{-2}$ mbar until the weight remains constant. This is followed by the MEK-DMK separation, which is carried out again until the weight remains constant.

The OsO$_4$ treatment and MEK-DMK separation must be repeated three times in total.

The remaining soft phase is then weighed accurately. This weight is denoted by M$_1$. It is then added to 80 ml of chlorobenzene and the mixture is refluxed for 30 minutes and cooled to below 80° C., after which 10 ml of benzaldehyde, 20 ml of tert-butyl hydroperoxide (75%) and 2 ml of a 0.003 molar solution of osmium tetroxide in chlorobenzene are added. The solution is then refluxed for 20 minutes and cooled to 60° C., after which the grafted polystyrene is precipitated by pouring the solution into 600 ml of methanol (acidified with one drop of HCl). The precipitate is left to stand for 12 hours and then filtered off under suction at 20° C. through a D4 frit and dried at 80° C. under $10^{-2}$ mbar until the weight remains constant (weight $M_2$). Whether this is exclusively polystyrene must be determined by measuring, for example, the refractive index. If it is found that polybutadiene residues are still present in the polystyrene, the $OsO_4$ treatment described above must be carried out again. As a rule, however, the procedure described is sufficient. The viscosity number of the dried grafted polystyrene is then determined.

The degree of grafting is calculated as follows:

$$\text{Degree of grafting} = \frac{M_2}{M_1 - M_2} \cdot 100 \, [\%]$$

6. The notched impact strength a in $kJ/m^2$ is determined according to DIN 53,753. The test specimens required for this purpose are compression molded at $T = 200°$ C.

7. To determine the particle size and distribution of the soft phase, electron micrographs of thin sections of the products of the Examples and of comparative specimens are prepared in a known manner.

The determination is carried out with the aid of image analysis by the method described by W. Alex, Zeitschrift für Aufbereitung und Verfahrenstechnik 13, (1972), Section 3.11. The number of particles evaluated was from 1,500 to 6,000.

The stated median particle size is the volume average of the particle size in all cases. Image analysis gives the integral volume distribution of the particle diameter of a sample.

From this, it is possible to determine the percentage by volume of the particles which has a diameter equal to or smaller than a certain size. The median particle diameter, which is also referred to as the $d_{50}$ value of the integral volume distribution, is defined as the particle diameter at which 50% by volume of the particles have a larger diameter than that corresponding to the $d_{50}$ value.

For the Examples and for comparative purposes, a commercial product, ®Buna HX 529 C from Bayer AG, was used as the rubber (elastomeric grafting base). According to the manufacturer, this is a homopolybutadiene having a mean molecular weight of 295,000 (weight average) and a content of 37% of cis structural units.

In the Examples and Comparative Experiments which follow, percentages are by weight.

EXAMPLE 1

In a continuously operated reactor cascade consisting of two stirred kettles connected in series and two reaction towers (tube reactors), a solution of 6.4% of polybutadiene (solution viscosity 165 mPa.s; 5% strength in toluene), 5% of EB, 85.2% of styrene and 3.3% of a medical white oil and 0.1% of an antioxidant (®Irganox 1076 from Ciba-Geigy AG, Basle) is polymerized with a throughput of 17 l/h to a solids content of $75 \pm 1\%$ by weight.

For this purpose, 17 l/h of the abovementioned solution are first heated to $T = 125°$ C., 3.0 g/h of 1,1-di-tert-butylperoxy-3,3,5-trimethylcyclohexane are added and polymerization is carried out in a 12 l stirred kettle at $T = 124°$ C. to a solids content of 17%. The kettle content is discharged continuously, 5.6 g/h of tert-dodecyl mercaptan are added and the mixture is fed into a 30 l stirred kettle (anchor stirrer, 35 rpm). There, it is polymerized at 129° C. to a solids content of 27%. The content of the second kettle is discharged continuously and fed to a 30 l tower reactor serving as the third reaction stage. In this reactor, polymerization is carried out to a solids content of 55% at increasing temperatures from 130° to 145° C., and finally polymerization is carried out in a second downstream tower reactor to a solids content of 75% at increasing temperatures from 137° to 156° C. The discharged mixture is then heated to 240° C. in a heat exchanger and let down into a vessel kept at 3 mbar. Here, the solvent and unconverted monomer are stripped off. The polymer melt is discharged, granulated and filled into containers.

EXAMPLE 2

A molding material having the following characteristics is obtained in the same manner as in Example 1, except that the solids content in the first stirred kettle is 60% and only 3.6 g of tert-dodecyl mercaptan is used after the first stirred kettle:

The median particle size is 2.4 μm, the molecular weight of the hard matrix is 184,000 g/mol, the molecular weight of the graft branches is 220,000 g/mol and the degree of grafting is 87%.

EXAMPLE 3

A molding material which has a median particle size of 5 μm, a molecular weight of the hard matrix of 182,000 g/mol, a molecular weight of the grafted branches of 215,000 g/mol and a degree of grafting of 82% is obtained in the same manner as in Example 2, except that stirring in the second stirred kettle is carried out at a speed of 10 rpm.

EXAMPLE 4

The conditions correspond to those of Example 3. After the first stirred kettle, 1.7 g of tert-dodecyl mercaptan are added. The median particle size is 4.1 μm, the molecular weight of the hard matrix is 196,000 g/mol, the molecular weight of the grafted branches is 217,000 g/mol and the degree of grafting is 83%.

EXAMPLE 5

The conditions correspond to those of Example 1. 1.5 g/h of 1,1-di-tert-butylperoxy-3,3,5-trimethylcyclohexane are added to the preheated reaction mixture and polymerization in the first reaction kettle is carried out at $T = 127°$ C.; the reaction in the second stirred kettle is continued at 133° C.

The molecular weight of the hard matrix is 158,000 g/mol, the median particle diameter is 4.6 μm %, the molecular weight of the grafted branches is 210,000 g/mol and the degree of grafting is 56%.

COMPARATIVE EXPERIMENT 1

A molding material for which the matrix molecular weight is 139,000 g/mol is obtained in the same manner as in Example 1 but with 12.0 g of tert-dodecyl mercaptan, added after the first stirred kettle. The particle size is 3.9 μm, the molecular weight of the grafted branches is 216,000 g/mol and the degree of grafting is 84%.

COMPARATIVE EXPERIMENT 2

A molding material for which the matrix molecular weight is 162,000 g/mol, the median particle size is 3.8 μm, the molecular weight of the grafted branches is 170,000 g/mol and the degree of grafting is 71% is obtained in the same manner as in Example 1, except that tert-dodecyl mercaptan is added in the first stirred kettle.

COMPARATIVE EXPERIMENT 3

A molding material having a matrix molecular weight of 163,000 g/mol is obtained in the same manner as in Example 1, except that no 1,1-di-tert-butylperoxy-3,3,5-trimethylcyclohexane is added and the reaction temperature is increased to values which guarantee that the solids contents in the individual reactors will be maintained. The molecular weight of the grafted branches is 195,000 g/mol, the median particle size is 4.1 μm and the degree of grafting is 27%.

COMPARATIVE EXPERIMENT 4

A molding material which has a median particle size of 0.5 μm, a molecular weight of the matrix of 165,000 g/mol and a molecular weight of the grafted branches of 216,000 g/mol and for which a degree of grafting of 82% is determined is obtained in the same manner as in Example 1, except that a stirrer speed of 200 rpm is set in the second stirred kettle.

We claim:

1. An impact-resistant thermoplastic molding material, containing, based in each case on A+B, from 80 to 50% by weight of a hard matrix A of polystyrene having a viscosity average molecular weight $\overline{M}\eta$ of from 150,000 to 200,000 and
   from 50% to 20% by weight of a soft phase B which is uniformly distributed in the hard matrix and has a median particle diameter $d_{50}$ (volume average) of from 1 to 10 μm, whereby the soft phase B is obtained by polymerizing styrene in the presence of an elastomeric grafting base selected from the group consisting of polybutadiene, polyisoprene, and copolymers of butadiene and/or of isoprene and styrene, wherein the viscosity average molecular weight of grafted branches is from 1.1 to 1.35 times the molecular weight of the hard matrix and the degree of grafting is from 50 to 100%;
   wherein the degree of grafting is calculated as follows:

$$\text{Degree of grafting} = \frac{M_2}{M_1 - M_2} \cdot 100\%$$

wherein $M_1$ is the weight of the soft phase (B) and $M_2$ is the weight of the dried grafted polystyrene.

2. An impact-resistant thermoplastic molding material as claimed in claim 1, also containing conventional additives.

3. A molding material as claimed in claim 1, which has
   from 75 to 55% by weight of the hard matrix A and
   from 45 to 25% by weight of the soft phase B.

TABLE 1

|  |  | Example |  |  |  |  | Comparative Experiment |  |  |  |
|---|---|---|---|---|---|---|---|---|---|---|
|  |  | 1 | 2 | 3 | 4 | 5 | 1 | 2 | 3 | 4 |
| PolyButadiene content | (%) | 8.0 | 8.0 | 8.0 | 8.0 | 8.0 | 8.0 | 8.0 | 8.0 | 8.0 |
| Yield stress | (N/mm$^2$) | 16.2 | 17.4 | 13.7 | 14.5 | 14.0 | 15.0 | 15.1 | 14.4 | 27.3 |
| Tensile strength | (N/mm$^2$) | 14.7 | 14.8 | 14.1 | 14.3 | 14.0 | 14.6 | 14.5 | 14.6 | 18.0 |
| Elongation at break | (%) | 31 | 31 | 32 | 29 | 30 | 31 | 29 | 30 | 17 |
| $a_{kl}$ | (kJ/m$^2$) | 14.9 | 14.6 | 14.4 | 14.8 | 13.9 | 10.6 | 11.0 | 9.7 | 8.6 |
| $d_{50}$ | (μm) | 2.8 | 2.4 | 5 | 4.1 | 4.6 | 3.9 | 3.8 | 4.1 | 0.5 |
| $M\eta$ (matrix) | (g/mol) | 167000 | 184000 | 182000 | 196000 | 158000 | 139000 | 162000 | 163000 | 165000 |
| $M\eta$ (grafted branches) | (g/mol) | 214000 | 220000 | 215000 | 217000 | 210000 | 216000 | 170000 | 195000 | 216000 |
| Degree of grafting | (%) | 85 | 87 | 82 | 83 | 56 | 84 | 71 | 27 | 82 |

* * * * *